United States Patent [19]
Böske

[11] 3,936,380
[45] Feb. 3, 1976

[54] MEANS TO COUNTERACT A CLOGGING OF DRAIN PIPES

[76] Inventor: Johann Böske, 2849 Goldenstedt, Arkeburg, Germany

[22] Filed: July 15, 1974

[21] Appl. No.: 488,460

Related U.S. Application Data
[62] Division of Ser. No. 277,470, Aug. 2, 1972, abandoned.

[52] U.S. Cl. .................................. 210/170; 61/11
[51] Int. Cl.² ........................................... C02B 5/06
[58] Field of Search ................................. 61/10–13; 252/180, 83; 210/170, 58, 198, 199; 134/2, 4, 22; 222/187

[56] References Cited
UNITED STATES PATENTS
| | | | |
|---|---|---|---|
| 2,382,262 | 8/1945 | Scherer et al. | 252/180 |
| 2,768,949 | 10/1956 | Hewey | 61/11 |
| 3,830,373 | 8/1974 | Sixt et al. | 61/11 |

FOREIGN PATENTS OR APPLICATIONS
| | | | |
|---|---|---|---|
| 1,333,829 | 6/1962 | France | 61/11 |
| 2,017,732 | 10/1971 | Germany | 61/11 |

OTHER PUBLICATIONS
Knowles et al., "The Protection of Metals with Tannins", J. Oil & Coulor Chemists Association, Vol. 41, pp. 10–23 (1958).

*Primary Examiner*—Samih N. Zaharna
*Assistant Examiner*—Benoit Castel
*Attorney, Agent, or Firm*—Charles Hieken; Jerry Cohen

[57] ABSTRACT

A plastic or clay drain system includes porous plastic or clay pipes at least partially covered with filter material and a dispenser of tannin for introducing tannin into the drain flow.

14 Claims, 12 Drawing Figures

MEANS TO COUNTERACT A CLOGGING OF DRAIN PIPES

BACKGROUND OF THE INVENTION

This is a division of application Ser. No. 277,470 filed Aug. 2, 1972, now abandoned.

The present invention is concerned with means for counteracting clogging of drain pipes in drainage plants by earth components which have a tendency to form ochre.

It is known that drain pipes tend to a premature clogging, which is usually named "ochre formation" and is due to a conversion of water-soluble components present in earth into oxide compounds which are insoluble in water and deposit on the internal surfaces of drain pipes and also in drain filters. No effective means have hitherto been found to prevent this clogging process so that one had to face the fact of a relatively limited working life due to this so-called ochre formation.

It is an object of the present invention to provide means for preventing clogging of drain pipes by ochre formation.

SUMMARY OF THE INVENTION

For the solution of this problem, the present invention proceeds from the consideration that the components of the earth which otherwise would give rise to ochre formation are subjected to physico-chemical influences which prevent ochre formation at the entrance of the drain stream into the cavities of the drain pipe.

Following from this appreciation of the problem, it has been solved, according to the present invention, by the addition of a reagent, preferably of a tannin, which converts the above-mentioned components of the earth into non-clogging compounds which drain off.

In order to ensure a conversion of the ochre forming components which is as complete as possible, an amount of the reagent should be available which is stoichiometrically necessary for the conversion. Therefore, the reagent is preferably added in an amount which depends upon the amount of ochre-forming components within the drainage area of the drain plant. An optimum exploitation of the available amount of reagent may be obtained by placing and arranging the reagent in such a manner that it will lead to a dissolving of an amount of the reagent by the drain water equal to the stoichiometrically necessary amount for a complete conversion of that amount of ochre-forming components which is carried along by the drain water.

The effective proportion of solution of ochre-forming components and of the reagent, respectively, may be controlled in such a manner that, having regard to the given solubilities, the stoichiometric amount is obtained by physical influences on the process of dissolving the reagent, for example, by the structure of an appropriate reagent dispenser, because the effective dissolving of the reagent depends not only upon the solubility but also on the manner in which the reagent is connected to or included within the dispenser and the manner in which the dispenser is exposed to the flow of drain water. In most cases, the desired ratio may be achieved by an appropriate arrangement of the reagent dispenser within the area of the drain flow.

When it is not possible or is difficult to ensure the stoichiometric ratio, it may be important to utilize a stoichiometric excess of the reagent which may be measured in dependence upon the effective ratio of solution of said component and reagent inasmuch as this ratio differs from the stoichiometric ratio. The desired dependence of the operative amount of reagent on the amount of drain water may easily be secured when the reagent is subjected to dissolving by suitable exposure to the natural drain water; otherwise this dependence may be obtained fairly exact by additional means.

Generally the available amount of reagent should be dependent upon the amount of ochre-forming components in the earth, taking into account that the operative amounts of both components will depend upon the amount of drain water, whereas the ratio of the operative amounts will depend upon the ratio of effective dissolving of ochre-forming components and reagent, respectively, and also taking into account that the latter ratio should be high enough to ensure that at least the stoichiometric amount of reagent is reached. On the other hand, tannin-dispensing products are mostly available at such a low price that it is preferred to use a large excess of reagent in order to ensure the desired stoichiometric ratio, even under unfavourable circumstances, which may be reached by a stoichiometric excess of, for example, 100% or more.

It is often advisable to provide a supply of reagent to the drainage area which is sufficient for the entire working life of the drain plant. In other cases, it may be preferred to provide smaller amounts of reagent from time to time during the working life of the drain plant. This may be done by inoculation of the drainage area with the reagent. The drain ground may be inoculated by placing the reagent upon the surface of the drainage area or a drain filter, if present, may be inoculated by injecting tannin into it by probes.

Preferably, the reagent is introduced together with a natural carrier or a carrier can be impregnated with the reagent. The drain pipes themselves may be used as a carrier when they have been made from porous material which can be saturated with the reagent.

The reagent may also be added, together with water from a supply thereof, preferably in a flushing back procedure. Such a method can also be used for cleaning out drain pipes after ochre formation has taken place.

Reagent dispensers are preferably arranged within the drain filter, especially in the form of an inner layer of the drain filter or in the form of material containing the reagent. It is, of course, also possible to provide one or more reagent dispensers within the cavity of a drain pipe, for example in the form of a layer on the inner surface of the drain pipe or in the form of water-permeable stuffings.

Drain wells are especially suitable for a subsequent addition of a reagent.

Reagent dispensers are preferably applied in the form of fibrous or granular material which is placed loosely into the drain pipe or into the ground to be drained or is included after having been manufactured to form water permeable mats or strips.

The reagent may be a natural or synthetic tannin. Tannin-containing natural products are usually available in fibrous or granulate form so that they may be used as reagent dispensers without further processing. In most cases, natural tannin dispensers with a high content of tannin are preferred, for example mimosa bark, catechu, by-products of tea-production, quebracho or extracts of tannin-containing natural products.

We have found that particularly good results are obtained when more than 25 grams and preferably 70 to 100 grams of reagent are used per meter length of drain pipe.

For a better understanding of the present invention, several embodiments thereof will now be described in more detail with reference to the accompanying drawings, in which:

DETAILED DESCRIPTION OF PREFERRED EMBODIMENTS

Figure 1:
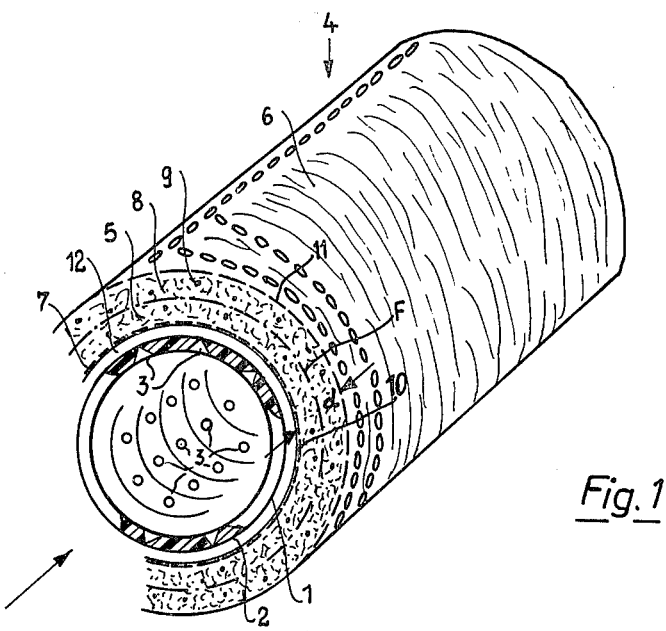
FIG. 1 is a schematic view of a drain pipe with a reagent dispenser in the form of granular inclusions.
Figure 2:
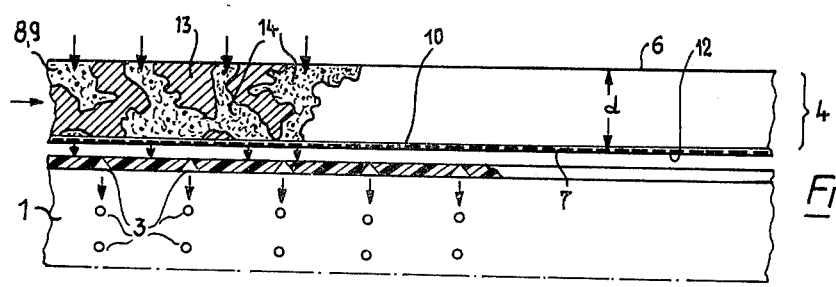
FIG. 2 is a longitudinal sectional view of a drain pipe with granular inclusions, in another embodiment.
Figure 3:
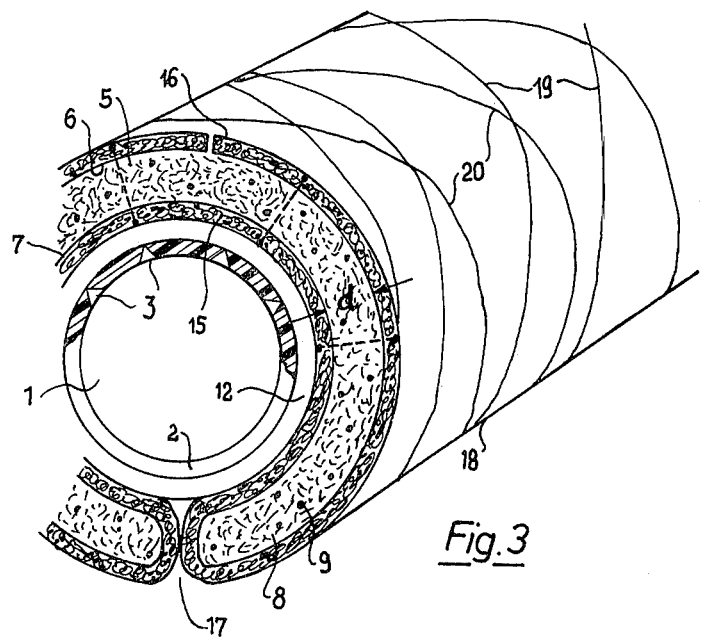
FIG. 3 is a modification of the embodiment illustrated in FIG. 1.

According to the embodiments illustrated in FIGS. 1 to 3, a corrugated plastic drainage pipe 1 is provided with slots or holes 3 in the corrugation troughs 2. The pipe 1 is enveloped by a drainage filter 4, several types of which are shown in FIGS. 1, 2 and 3.

FIG. 1 shows a drainage filter comprising a homogeneous layer 5 of granular tannin-containing filter material, for example quebracho, having an average thickness of 1 mm. The layer 5 consists of a relative loose material in order to obtain a suitably high F/Q ratio of the average filter surface F to the total cross-section Q of the water-bearing pores and channels between the particles of the filter, which F/Q ratio may be, for example 1: 0.4. Furthermore, the thickness $d$ of layer 5 should be great enough to ensure a sufficiently long duration of flow T of the drain water from its entrance at the outside 6 to its exit at the inside 7 of the filter layer 5. This duration of flow is dependent upon the amount of drain water per unit of the average filter surface F or per unit of length of the drain pipe and is also dependent upon the above mentioned ratio F/Q and the thickness $d$. The duration of flow can be influenced by the dimensions of F, Q and $d$ in such a manner that an almost complete prevention of ochre formation is achieved, having regard to the properties of the reagent and the ochre-forming components in the earth.

The reactivity of the reagent dispenser is largely dependent upon the concentration of tannin within the filter material and also on the size of the surface area of the granular or fibrous material, the surface area increasing with decreasing grain size. However, the reduction of grain size is limited by the demand for a good permeability for the drain water, which is subjected to a sufficient size of pores. An average grain size of 0.2 to 0.03 mm. has proved to be suitable for the present purposes. The optimum grain size or fiber size is also dependent upon the nature and origin of the reagent dispenser. Thus, the size can be greater if the dispenser is made from the bark of tannin-containing trees. The good influence of tannin is due to the fact that ferric compounds are formed which cannot cause clogging of the drain pipe by ochre formation. The filter material may be composed of normal granular or fibrous filter material 8 and tannin-containing filter material 9 of greater size as reagent dispenser.

In FIG. 1, the loose filter layer 5 is held in place by water-permeable boundary layers in the form of perforated foils 10 and 11, namely, an inner foil 10 covering the water-bearing corrugations 12 of the drain pipe 1 to prevent the ingress of filter material and an outer foil 11 forming external holding means and allowing water to enter into the filter layer 5. The filter layer 5 with foils 10 and 11 can be applied to the drain pipe in conventional manner.

The foils are shown in the drawing diagrammatically. In actual fact, the holes in the foils are much smaller in order to prevent the passage of particles from the earth into the filter layer 5 and from the filter layer into the corrugations of the drain pipe. Furthermore, the number of the holes is much greater than shown in the drawing.

FIG. 2 shows diagrammatically an embodiment in which filter material 8, 9 is, as in FIG. 1, embedded within the pores 14 of a wide-pore carrier body 13, a perforated foil 10 being provided on the inside of the carrier body 13. The carrier body 13 itself can be strong enough to be used as a drain pipe so that the inside of the filter layer 5 forms the cavity of the drain pipe.

The carrier body 13 may, for example, be made from a fibrous material, such as straw, which is glued together and which has previously been mixed with a granular or fibrous reagent-containing material or the wide pores of which are consolidation, are filled with granular reagent material, Natural reagent dispensers can be used to form a drain pipe or a full water-bearing drain track.

FIG. 3 illustrates an embodiment in which the filter layer 5 is bordered on the inside and outside by straw layers 15 and 16. These straw layers are preferable because they provide an exceptionally low resistance to the passage of drain water and, on the other hand, hold together the filter layer 5 in a satisfactory manner.

The drain filter, together with its boundary layers, can be manufactured as a preformed band 4, preferably by quilting, the preformed band being placed around the drain pipe by being pulled together with the drain pipe 1 through a conical nozzle in such a manner that the two edges of the band are brought in contact with one another, thus forming a longitudinal seam 17. The band 4 thus wrapped around the drain pipe 1 is fixed in position by a winding 18 consisting, for example, of two counterwound plastic threads 19,20. Drain filters 4 of different thickness $d$ may be employed by reason of having different qualities. Boundary layers may consist of a textile, gauze or fabric which is strong enough to hold together the filter 4 from manufacture until laying.

A reagent dispenser can also be formed by loosely introducing tannin-containing filter material into a drain trench during the laying of a drain pipe.

Figure 4:
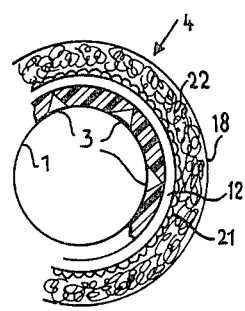
FIG. 4 is another modification of the embodiment illustrated in FIG. 1.

FIG. 4 illustrates an embodiment in which the drain filter comprises two layers, namely, a relative thin inner layer 21 of fibrous tannin-containing material, such as quebracho, or mimosa and a relatively thick outer layer 22 of a conventional filter material. The outer layer preferably consists of straw which can be fixed by a winding 18.

Figure 5:
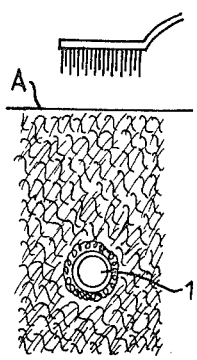
FIG. 5 illustrates a method of inoculating the ground above a drain pipe.
Figure 6:
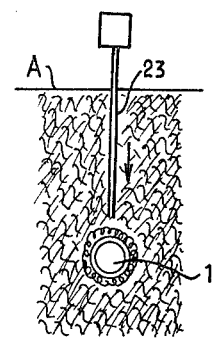
FIG. 6 illustrates a method of inoculating a drain filter.

The addition of tannin or other reagent into an existent drainage can be performed easily in liquid form by inoculation of the ground or filter, as is shown in FIGS. 5 and 6, tannin being poured on to the surface of the ground from a spray device S (FIG. 5) or being injected by a probe 23 (FIG. 6) into the ground or into filter 4.

Figure 7:
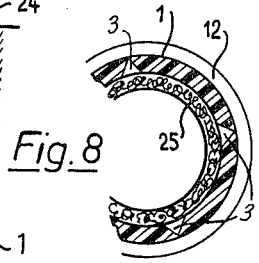
FIG. 7 illustrates a drain pipe in conjunction with a band-like reagent dispenser.

FIG. 7 illustrates a drainage in which band shaped reagent dispensers 24 are introduced during the mechanical laying of drain pipes beneath and possibly above the drain pipe 1.

Figure 8:
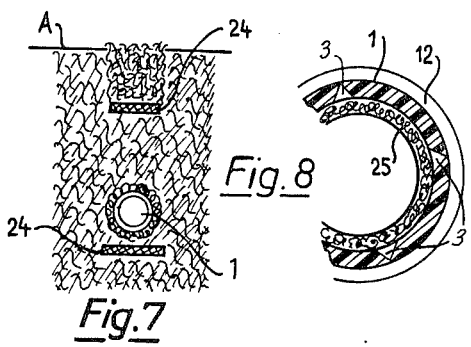
FIG. 8 illustrates a drain pipe with an inside layer which acts as a reagent dispenser.
Figure 9:
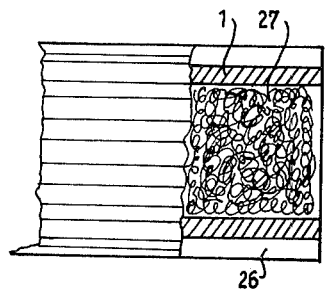
FIG. 9 illustrates a drain pipe with a water-permeable stuffing.

Provided that there is a sufficiently high affinity of reagent and ochre-forming components of the earth, it is advisable to place the reagent within the drain pipe, for example as shown in FIGS. 8 and 9. In the embodiment of FIG. 8, the drain pipe 1 is provided with a layer 25 of reagent-containing material, whereas in the embodiment of FIG. 9, the cavity of the drain pipe 1, especially of a clay pipe with longitudinal grooves 26 on its outside over the whole length or over parts of its length, is filled with stuffings 27 consisting of water-permeable mimosa or other reagent-containing material.

Reagent dispensers may be continuously distributed or may be concentrated at the beginning of the drain pipe or at certain intervals along the drain pipe.

Figure 10:
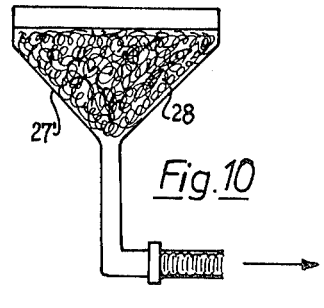
FIG. 10 illustrates a drain well with a reagent dispenser.

A reagent dispenser 28 may also be located within drain wells 27' as is shown in FIG. 10.

Figure 11:
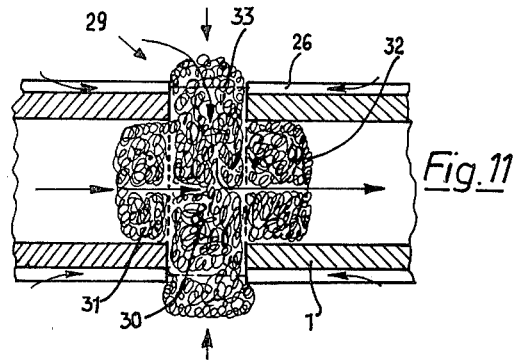
FIG. 11 illustrates a longitudinal sectional view through a drain pipe coupling constructed as a reagent dispenser.
Figure 12:
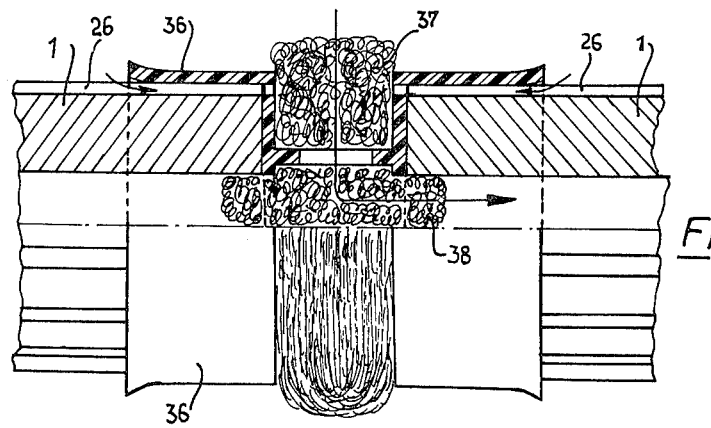
FIG. 12 illustrates another embodiment of a drain pipe coupling.

Especially in drain plants, the drain systems of which consist of clay pipes or other short pipes which are joined together by sockets or other connectors, as is shown in FIG. 11 or 12, the reagent dispenser may be formed as a connector 29 (FIG. 11) consisting of a middle disc-like part 30 of a thickness equal to the gap between the adjoining pipes 1,1 and two stuffing like projections 31,32 engaging the two pipes. The middle part 30 may be provided on its outside with a torus 33 but may also have substantially the same diameter as the pipes 1, as is indicated by dotted lines 34. The latter shape is especially suitable in the case of mechanical laying of drain pipes.

FIG. 12 illustrates a reagent dispenser formed as a filter ring 37 inserted within a conventional socket 36. In drain systems consisting of a row of clay pipes, all the drain water flows through the filter rings 37. In plastic drain pipes, however, at the joints of which only a small part of the entire drain water enters the drain pipe, it is advisable to provide additional stuffing shaped reagent dispensers 38, which may be inserted into the socket 36, as is shown in FIG. 12.

The reagent dispensers may consist entirely of biologically decomposable material, such as mimosa and quebracho, or partly of biologically decomposable natural material and non-decomposable synthetic material.

Reagent components other than tannins may be used which have the desired affinity to the ochre-forming components within the ground to be drained. The choice of the appropriate reagent will be best made depending upon the results of individual soil research for ochre-forming components.

I claim:
1. In a drain plant having underground plastic or clay drainpipes which have porous walls enveloped by filter material wherein local ground water is drained by radial inflow through said walls the improvement comprising,
   tannin dispensing means containing tannin connected to said pipe for delivering tannin into the drain flow to convert earth components which otherwise would cause the formation of ochre clogging said pipe into non-clogging materials.
2. Drain plant according to claim 1, wherein said means for dispensing tannin is arranged within drain wells of said pipe.
3. Drain plant according to claim 1, wherein the said means for dispensing tannin is in the form of a layer on the inner surface of said pipe.
4. Drain plant according to claim 1, wherein said pipe defines an inside cavity that is filled over at least parts of its length by said means for dispensing tannin in the form of water permeable stuffings.
5. Drain plant according to claim 1, wherein said means for dispensing tannin is provided in the form of fibrous or granular loose material.
6. Drain plant according to claim 1, wherein said means for dispensing tannin is provided in the form of water permeable mats or strips.
7. Drain plant according to claim 1, wherein said means for dispensing tannin contains by-products of tea-production.
8. Drain plant according to claim 1, wherein said means for dispensing tannin contains quebracho or an extract of quebracho.
9. Drain plant according to claim 1, wherein said tannin dispensing means comprises particles containing tannin having a thickness of 0.2 to 3.0 mm and preferably a thickness of about 1 mm.
10. Drain plant according to claim 1, wherein said means for dispensing tannin comprises filter material arranged within the pores of a wide-pore carrier body.
11. Drain plant according to claim 1, wherein said means for dispensing tannin comprises a layer of loose material arranged between water-permeable boundary layers having sufficient strength to enclose the loose material and form a package enveloping the pipe.
12. Drain plant according to claim 11, wherein a porous foil is provided as a boundary layer.
13. Drain plant according to claim 11, wherein a fabric is provided as a boundary layer.
14. Drain plant according to claim 11, wherein a straw layer is provided as a boundary layer.

\* \* \* \* \*